US005666823A

United States Patent [19]
Smith et al.

[11] Patent Number: 5,666,823
[45] Date of Patent: Sep. 16, 1997

[54] HIGH PRESSURE COMBUSTION TURBINE AND AIR SEPARATION SYSTEM INTEGRATION

[75] Inventors: Arthur Ramsden Smith, Telford; Donald Winston Woodward, New Tripoli, both of Pa.

[73] Assignee: Air Products and Chemicals, Inc., Allentown, Pa.

[21] Appl. No.: 595,015

[22] Filed: Jan. 31, 1996

[51] Int. Cl.$^6$ ........................................ F25J 3/00
[52] U.S. Cl. ................ 62/646; 62/653; 62/915; 60/39.12
[58] Field of Search ................ 62/646, 653, 915; 60/39.12

[56] References Cited

U.S. PATENT DOCUMENTS

| | | | |
|---|---|---|---|
| 3,731,495 | 5/1973 | Coveney | 62/915 |
| 4,019,314 | 4/1977 | Springman | 60/39.02 |
| 4,224,045 | 9/1980 | Olszewski et al. | 62/30 |
| 4,557,735 | 12/1985 | Pike | 55/26 |
| 4,697,415 | 10/1987 | Schiffers | 60/30.12 |
| 4,785,621 | 11/1988 | Alderson et al. | 60/39.12 |
| 5,081,845 | 1/1992 | Allam et al. | 62/24 |
| 5,082,482 | 1/1992 | Darredeau | 62/24 |
| 5,084,081 | 1/1992 | Rohde | 62/22 |
| 5,098,457 | 3/1992 | Cheung et al. | 62/24 |
| 5,148,680 | 9/1992 | Dray | 62/24 |
| 5,224,336 | 7/1993 | Agrawal et al. | 62/37 |
| 5,237,822 | 8/1993 | Rathbone | 62/646 |
| 5,303,556 | 4/1994 | Dray et al. | 62/24 |
| 5,355,682 | 10/1994 | Agrawal et al. | 62/41 |
| 5,386,686 | 2/1995 | Chretien et al. | 60/39.02 |
| 5,406,786 | 4/1995 | Scharpf | 60/39.05 |
| 5,410,869 | 5/1995 | Muller | 60/39.02 |
| 5,459,994 | 10/1995 | Drnevich | 60/39.02 |

FOREIGN PATENT DOCUMENTS 2067668  7/1981  United Kingdom ............ F02C 3/28

OTHER PUBLICATIONS

Todd, D. M. "Clean Coal Technologies for Gas Turbines", presented at GE Turbine State-of-the-Art Technology Seminar, Jul. 1993, pp. 1–18.

(List continued on next page.)

*Primary Examiner*—Ronald C. Capossela
*Attorney, Agent, or Firm*—John M. Fernbacher

[57] ABSTRACT

A high pressure combustion turbine is integrated with a double column cryogenic air separation system by cooling and purifying a portion of the compressed air from the combustion turbine compressor, work expanding a first portion of the resulting cooled air, and introducing the expanded air into the low pressure column. A second portion of the resulting cooled air is further cooled, throttled, and introduced into the high pressure column. A nitrogen product stream is returned to the turbine combustor, and a portion of the nitrogen product stream optionally is cooled, throttled, and recycled into the high pressure column. Preferably the higher pressure column operates at an absolute pressure which is about 20% to about 85% of the absolute pressure of the compressed air from the combustion turbine air compressor. Optionally an oxygen-rich liquid or a nitrogen-rich liquid is withdrawn from the higher pressure column during a period of low nitrogen product demand, stored, and withdrawn from storage to supplement feed to the lower pressure column during periods of high nitrogen product demand. Alternatively, high purity liquid oxygen is withdrawn from the lower pressure column during a period of low oxygen product, stored, and withdrawn from storage during periods of high oxygen product demand to supplement oxygen product withdrawn from the higher pressure column.

24 Claims, 8 Drawing Sheets

OTHER PUBLICATIONS

Anand, A. K. et al. "New Technology Trends for Improved IGCC System Performance", presented at International Gas Turbine and Aeroengine Congress and Exposition, Houston, Texas, Jun. 5–8, 1995.

Rao, A. D. et al. "Integration of Texaco TQ Gasification with Elevated Pressure ASU", presented at the 13th EPRI Conference on Gasification Power Plants, San Fransisco, CA, Oct. 19–21, 1994.

Smith, A. R. et al. "Improved IGCC Power Output and Economics Incorporating a Supplementary Gas Turbine", presented at 13th EPRI Conference on Gasification Power Plants, San Fransisco, CA, Oct. 19–21, 1994.

5,666,823

HIGH PRESSURE COMBUSTION TURBINE AND AIR SEPARATION SYSTEM INTEGRATION

TECHNICAL FIELD OF THE INVENTION

The invention pertains to the integrated operation of high pressure combustion turbines with cryogenic air separation systems.

BACKGROUND OF THE INVENTION

Combustion turbines can be readily integrated with air separation systems to produce atmospheric gas products and electric power. The combustion turbine air compressor supplies compressed air for the turbine combustor and also may provide some or all of the compressed air feed to the air separation system. Typically the combustion turbine is integrated with a cryogenic air separation system to provide oxygen and/or nitrogen products, and the combustion turbine and air separation systems can be integrated with a gasification process in a gasification combined cycle power generation system.

The generation of electricity by advanced gasification combined cycle power generation systems offers the potential for reduced power cost and lower environmental impact than standard coal-fired power plants. In these advanced systems, coal or other carbonaceous material is gasified with oxygen and the produced gas is cleaned to yield a low-sulfur fuel gas. This fuel gas is utilized in a gas turbine generation system to produce electric power with reduced environmental emissions. Some or all of the nitrogen produced by the air separation system preferably is returned to the combustor to reduce the formation of nitrogen oxides and improve the efficiency of the integrated combustion turbine/cryogenic air separation system.

The growing interest in gasification combined cycle (GCC) technology in recent years has been stimulated by the higher efficiency and demonstrated reliability of advanced gas turbines, gasification processes, and air separation systems which are utilized in integrated gasification combined cycle (IGCC) systems. The proper integration of these three main components of an IGCC system is essential to achieve maximum operating efficiency and minimum power cost.

A general review of the current art in GCC and IGCC power generation systems is given by D. M. Todd in an article entitled "Clean Coal Technologies for Gas Turbines" presented at the GE Turbine State-of-the-Art Technology Seminar, July 1993, pp. 1–18. A. K. Artand et al present a review of the factors involved in the design of IGCC systems in a paper entitled "New Technology Trends for Improved IGCC System Performance" presented at the International Gas Turbine and Aeroengine Congress and Exposition, Houston, Tex., Jun. 5–8, 1995. A review of various integration techniques and the impact thereof on GCC economics is given in a paper by A. D. Rao et al entitled "Integration of Texaco TQ Gasification with Elevated Pressure ASU" presented at the 13$^{th}$ EPRI Conference on Gasification Power Plants, San Francisco, Calif., Oct. 19–21, 1994.

In a paper entitled "Improved IGCC Power Output and Economics Incorporating a Supplementary Gas Turbine" presented at the 13$^{th}$ EPRI Conference on Gasification Power Plants, San Francisco, Calif., Oct. 19–21, 1994, A. R. Smith et al review several modes of integration between the gas turbine and the air separation unit in an IGCC process. In one mode, the air separation unit feed air is provided by a separate compressor and a portion of the nitrogen product from the air separation unit is compressed and introduced into the gas turbine combustor. This nitrogen-integrated mode allows operation of the IGCC system at increased gas turbine power output and reduced $NO_x$ formation. In an alternative operating mode, nitrogen integration is combined with air integration in which a portion of the feed air to the air separation unit is supplied by extracted air from the gas turbine compressor. This alternative mode, defined as air and nitrogen integration, gives greater operating flexibility and allows for a higher degree of optimization during IGCC system operation at part load conditions.

Combustion-based power generation systems, including IGCC systems, are subject to periods of operation below system design capacity due to changes in ambient air temperature and/or the cyclic demand for electric power. During these periods, such systems operate below design efficiency. The equipment selection and process design of an IGCC system therefore must address steady-state operation at design capacity as well as operation at part load or turndown conditions. The air- and nitrogen-integrated IGCC system described above is a preferred option because of the potential for operating such a system at maximum overall efficiency, particularly when the system operates at part load or turndown conditions for significant periods.

Cryogenic air separation processes can be designed specifically for integration with combustion turbines or gas turbines, and air separation processes having both air and nitrogen integration with combustion turbines are of particular utility. Most air separation processes in this service utilize the well-known double column distillation system for efficient recovery of oxygen and nitrogen products.

U.S. Pat. No. 3,731,495 discloses an air- and nitrogen-integrated combustion turbine system in which a portion of the air from the gas turbine compressor is further compressed, treated to remove gaseous impurities, cooled, and introduced in total into the high pressure column of a double column distillation system.

U.S. Pat. No. 4,019,314 describes an air- and nitrogen-integrated steam generation/combustion turbine system in which a portion of the air from the gas turbine compressor is further compressed and introduced into an air separation unit. Oxygen product is used in a coal gasification system which generates fuel for the combustion turbine.

An air- and nitrogen-integrated combustion turbine system is disclosed by U.S. Pat. No. 4,224,045 in which a portion of the air from the combustion turbine compressor is cooled and purified in a reversing heat exchanger. The cooled purified air is divided into a first and a second portion, the first portion is introduced into the high pressure column of a double column distillation system, and the second portion is warmed, work-expanded, and introduced into the low pressure column. Optionally, the portion of air from the combustion turbine compressor is compressed further before cooling and purification. Optionally, the portion of air from the combustion turbine compressor is (1) work expanded before cooling and purification or (2) work expanded after cooling and purification but before dividing the air for introduction into the low and high pressure columns.

U.S. Pat. No. 4,557,735 describes an air- and nitrogen-integrated combustion turbine system in which a portion of the air from the combustion turbine compressor is purified by adsorption and cooled to provide the sole feed to a double column distillation system via the high pressure column. A nitrogen product from the high pressure column is expanded to provide refrigeration, utilized to regenerate the feed adsorption system, compressed, and introduced into the combustor of the combustion turbine system.

An air- and nitrogen-integrated combustion turbine system further integrated with a coal gasification system which provides fuel for the combustion turbine is described in U.S. Pat. No. 4,697,415. Extracted air from the combustion turbine compressor is introduced directly into the air separation system without either expansion or further compression.

U.S. Pat. No. 5,386,686 describes an air- and nitrogen-integrated combustion turbine system in which the oxygen content of the combined feed air and return nitrogen to the combustor is controlled by controlling the flow rate of the extracted air or the return nitrogen.

Air- and nitrogen-integrated combustion turbine systems are described in U.S. Pat. No. 5,406,786 in which the heat generated in feed air and oxygen product compression is used to humidify compressed air to the combustor of the combustion turbine system. The portion of air extracted from the combustion turbine compressor optionally is work-expanded before introduction into the air separation system.

Nitrogen-integrated combustion turbine systems are described in U.S. Pat. Nos. 5,081,845, 5,410,869, and 5,459,994, and in UK Patent Application No. GB 2 067 668 A.

The storage of one or more cryogenic liquids during periods of low product demand in low temperature air separation systems is described in U.S. Pat. Nos. 5,082,482, 5,084,081, and 5,224,336. During periods of high product demand the stored liquid is withdrawn as additional product or utilized within the air separation system as intercolumn feed or reflux.

High pressure oxygen and/or nitrogen products can be obtained by pumping liquid(s) withdrawn from a cryogenic air separation system and vaporizing the pressurized pumped liquids by heat transfer with cooling feed air streams as described by representative U.S. Pat. Nos. 5,098,457, 5,148,680, 5,303,556, and 5,355,682.

Combustion turbine systems currently in operation typically supply combustion air at pressures up to 200 psia. New combustion turbine systems recently have been introduced which operate at higher pressures in which the combustion air is provided in the range of 240 to 440 psia. These new high pressure turbine systems operate at higher efficiencies than the lower pressure systems currently in operation, and offer the potential for improved integration with cryogenic air separation systems. Improved methods for the integration of such high pressure combustion turbines with cryogenic air separation systems are described in the invention disclosed below and defined by the claims which follow.

SUMMARY OF THE INVENTION

An integrated combustion turbine/air separation process according to the prior art includes the steps of compressing air in a gas turbine air compressor, combusting a first portion of the resulting compressed air with a fuel in a gas turbine combustor to form hot combustion products, expanding the resulting hot combustion products in a gas turbine expander which drives the gas turbine air compressor and optionally an electric generator, cooling a second portion of the compressed air, removing impurities from the resulting cooled compressed air, and separating the resulting purified compressed air into one or more products. According to the present invention, the separation of the purified compressed air is carried out by cooling the purified compressed air, work expanding a first portion of the resulting cooled air, and introducing the resulting cooled work-expanded air into a lower pressure distillation column. A second portion of the resulting cooled air is further cooled and reduced in pressure, and the resulting reduced-pressure cooled air is introduced into a higher pressure distillation column at an absolute pressure which is typically about 20% to about 85% of the absolute pressure of the compressed air from the combustion turbine air compressor. The higher pressure distillation column operates at an absolute pressure between 120 and 380 psia, preferably between 190 and 280 psia. An oxygen-enriched liquid bottoms stream is withdrawn from the higher pressure distillation column, cooled and reduced in pressure, and the resulting cooled reduced-pressure stream is introduced into the lower pressure distillation column. A nitrogen-rich product is withdrawn from the lower pressure distillation column.

Preferably, at least a portion of the nitrogen-rich product from the lower pressure distillation column is warmed, compressed, and introduced into the combustor. Typically the nitrogen-rich product contains less than 4 mole % oxygen. Optionally, the process further comprises cooling a portion of the warmed compressed nitrogen-enriched stream, reducing the pressure of the resulting cooled stream, and introducing the resulting cooled reduced-pressure stream into the higher pressure distillation column.

The further cooling of the second portion of the resulting cooled air may condense the air completely, and the pressure of this condensed air is reduced by isenthalpic throttling or work expansion before introduction into the higher pressure distillation column. Alternatively, the resulting cooled air may be partially condensed, the partially condensed air is separated into a vapor and a liquid, the liquid is reduced in pressure by isenthalpic throttling or work expansion and introduced into the higher pressure distillation column, and the vapor is work-expanded and also introduced into the higher pressure distillation column.

If necessary, additional feed air is compressed, purified, and cooled, and the cooled purified air is introduced into the higher pressure distillation column to supplement the purified compressed air feed from the combustion turbine compressor.

In the air separation process earlier described, an oxygen-enriched liquid stream optionally is withdrawn from the lower pressure distillation column, pumped to an elevated pressure, warmed by indirect heat exchange with the purified compressed air and optionally other process streams. This cools the purified compressed air and vaporizes the liquid to provided an elevated pressure oxygen-enriched gas product. A portion of this pressurized liquid oxygen from the lower pressure column can be stored during periods of low demand for the elevated pressure oxygen-enriched gas product and at lower ambient temperatures (e.g. at night). During periods of high demand for the elevated pressure oxygen-enriched gas product and at higher ambient temperatures (e.g. during the day), the stored liquid oxygen is withdrawn and combined with the oxygen-enriched liquid stream prior to introduction into the liquid oxygen pump.

The elevated pressure oxygen-enriched gas product can be utilized in the gasification of carbonaceous material to produce the fuel for the gas turbine combustor in an integrated gasification combined cycle (IGCC) power generation system.

In the air separation process earlier described, an oxygen-enriched liquid bottoms is withdrawn from the higher pressure column, cooled, reduced in pressure, and introduced into the lower pressure column. During periods of low demand for the elevated pressure oxygen- and nitrogen-enriched gas products, and at lower ambient temperatures (e.g. at night), a portion of the liquid bottoms is stored.

During periods of high demand for the elevated pressure oxygen-enriched and nitrogen-enriched gas products and at higher ambient temperatures (e.g. during the day), the stored liquid is combined with the oxygen-enriched liquid bottoms prior to introduction into the lower pressure distillation column.

A nitrogen-enriched vapor stream optionally is withdrawn from the higher pressure distillation column, condensed, pumped to an elevated pressure, and warmed by indirect heat exchange with the purified compressed air feed to the distillation columns and optionally other process streams, thereby cooling the purified compressed air and vaporizing the liquid to provide an elevated pressure nitrogen-enriched gas product. A nitrogen-enriched liquid is withdrawn from the higher pressure distillation column, cooled, reduced in pressure, and introduced into the lower pressure distillation column as reflux. During periods of low demand for the elevated pressure nitrogen-enriched gas product and at lower ambient temperatures (e.g. at night), a portion of the nitrogen-enriched liquid from the higher pressure distillation column is stored. During periods of high demand for the elevated pressure nitrogen-enriched gas product and at higher ambient temperatures (e.g. during the day) the stored nitrogen-enriched liquid is combined with the nitrogen-enriched liquid prior to introduction into the lower pressure distillation column as reflux.

In an alternative embodiment, a portion of the resulting cooled compressed air is work expanded, cooled, purified, further cooled, and introduced into the higher pressure distillation column. The work generated in the work expansion step provides a portion of the work required to compress the nitrogen-rich product from the lower pressure distillation column prior to introducing the resulting warmed compressed nitrogen-enriched stream into the turbine combustor. If supplemental air feed is required, an additional stream of air is compressed and combined with the cooled compressed air from the combustion turbine compressor prior to expansion and removal of impurities therefrom. Optionally, the additional compressed air is combined with the cooled expanded compressed air prior to removing impurities therefrom. Alternatively, supplemental compressed air can be provided to both the lower and higher pressure distillation columns by utilizing a multi-staged compressor which provides an intermediate stage lower pressure air stream and a final stage higher pressure air stream. The lower and higher pressure supplemental air streams are combined respectively with the higher and lower pressure air feed streams before cooling and purification.

Unlike prior art teaching on integrated combustion turbine/air separation systems, the purified extracted air of the present invention is introduced into the air separation distillation columns by cooling the entire stream to an intermediate temperature, withdrawing a portion for work expansion into the lower pressure column, and further cooling the remaining air for pressure reduction into the higher pressure column. The pressure reduction of the cooled purified feed air into the higher pressure column is a unique feature of the present invention which allows independent control of the feed pressures to the lower pressure column and the higher pressure column. In addition, the feed pressures to both columns can be operated below but otherwise independent of the pressure of the extracted air from the combustion turbine compressor. The distillation columns can be operated at constant pressure regardless of changes in the extracted air pressure, which allows the air separation system to operate in a stable manner.

DETAILED DESCRIPTION OF THE INVENTION

Conventional heavy-duty combustion turbine systems (excluding aero-derivative turbines) currently in operation supply compressed air to the combustor at pressures up to about 200 psia. New combustion turbine systems recently have been introduced which operate at higher pressures in which combustion air is provided at pressures up to 400 psia and above. These new high pressure turbine systems operate at higher efficiencies than the lower pressure systems currently in operation, and offer the potential for improved integration with cryogenic air separation systems. These combustion turbine systems normally have more extracted air available at lower ambient temperatures and when oxygen product demand is lowest (e.g. at night), and have less extracted air available at higher ambient temperatures when oxygen product demand is greatest (e.g. during the day).

The present invention offers several alternative processes for the integration of these new high pressure combustion turbines with cryogenic air separation systems. These new integration methods allow the efficient use of high pressure extracted air from the combustion turbine compressor to reduce equipment costs, decrease the parasitic power required for operation of the air separation system, and provide stable operation during variations in combustion turbine load.

Figure 1:
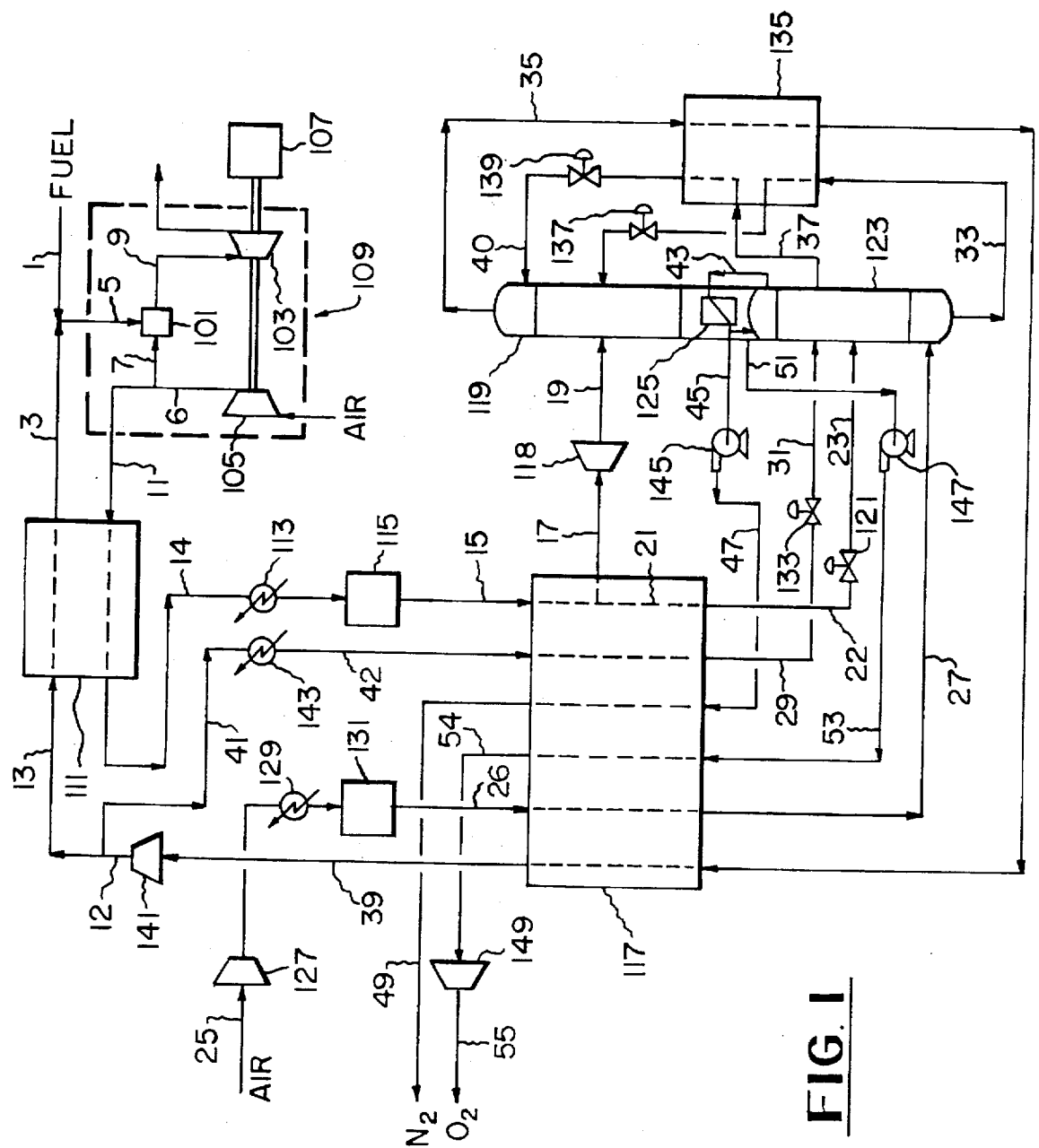
FIG. 1 is a schematic flow diagram of one embodiment of the present invention.

The first embodiment of the invention is illustrated in the integrated combustion turbine/air separation system of FIG. 1. Fuel 1 is combined optionally with nitrogen 3 (later defined) and the combined stream 5 is combusted with compressed air 7 in combustor 101. Fuel 1 is preferably natural gas or synthesis gas produced by the gasification of carbonaceous material, but other gaseous fuels or liquid fuels may be used. Compressed air 7 is provided by compressor 105 at a pressure greater than 150 psia, preferably 240 to 440 psia. Hot combustion gas 9 at 2000° to 2600° F. and 240 to 440 psia is expanded through hot gas expander 103 to generate shaft work which drives compressor 105 and optionally electric generator 107. The integrated combustor 101, hot gas expander 103, and compressor 105 is defined herein as combustion turbine 109. High pressure combustion turbine 109 is typical of new commercially-available systems such as the G and H series manufactured by General Electric and the GT 24/26 made by ABB.

Compressed air 11, defined by the term "extracted air", is withdrawn as a portion of compressed air 6 from compressor 105 at a temperature above 600° F. Extracted air 11 is cooled against nitrogen 13 (later defined) in heat exchanger 111, cooled air 14 is further cooled in cooler 113 and treated in purification system 115 to remove water, carbon dioxide, and other components which could freeze at cryogenic temperatures. Purification system 115 is preferably a temperature swing and/or pressure swing adsorption system of a type known in the art.

Purified air 15 is cooled in heat exchanger 117 against cold process streams (later defined), a portion 17 is withdrawn at a temperature of −150° to −200° F., and work expanded in expander 118. Cooled air 19 is introduced into lower pressure distillation column 119 at a temperature between −275° and −290° F. and a pressure between 50 and 100 psia. The remaining purified air 21 is further cooled and typically is at least partially condensed, cooled air 22 is reduced in pressure across throttling valve 121, and the resulting air stream 23 at a temperature between −240° and −260° F. and a pressure between 150 and 275 psia is introduced into higher pressure distillation column 123. Typically cooled air 22 is fully condensed. Depending on process conditions, the pressure of cooled air 22 alternatively can be reduced in an expansion turbine. Higher pressure distillation column 123 preferably operates at an absolute pressure of about 20% to about 85% of the absolute pressure of extracted air 11 from combustion turbine air compressor 105.

Lower pressure column 119 and higher pressure column 123 are thermally integrated by reboiler-condenser 125 in the well-known double column distillation system for cryogenic air separation. If extracted air 11 does not provide sufficient air feed to the double column distillation system, supplemental air is provided by compressing air 25 in main air compressor 127, cooling and purifying the compressed air in cooler 129 and purification system 131 respectively, and further cooling the purified air 26 in heat exchanger 117. Purification system 131 is preferably a temperature swing and/or pressure swing adsorption system of a type known in the art. Cooled air 27 is introduced at or near the bottom of higher pressure column 123. Optionally, cold recycled nitrogen-rich stream 29 (later defined) is reduced in pressure across throttling valve 133 to produce additional refrigeration and cooled expanded nitrogen-rich stream 31 is introduced into higher pressure column 123.

Crude liquid oxygen 33 is cooled in heat exchanger 135 against cold nitrogen 35 (later defined), reduced in pressure across throttling valve 137, and introduced into lower pressure column 119. Nitrogen-rich liquid 37 is withdrawn at an intermediate point from higher pressure column 123, cooled in heat exchanger 135, reduced in pressure across throttling valve 139, and introduced at the top of lower pressure column 119 as reflux. Cold nitrogen 35, typically containing 0.1 to 4.0 mole % oxygen, is withdrawn at the top of lower pressure column 119, warmed in heat exchanger 135, and warmed further in heat exchanger 117 thereby providing refrigeration for cooling air feed streams 15 and 26. Warmed nitrogen 39 preferably is compressed in compressor 141, and a portion 13 of the resulting compressed nitrogen 12 is warmed in heat exchanger 111 against extracted compressed air 11. The resulting nitrogen 3 is introduced into combustor 101 in combination with fuel 1.

The return of nitrogen 3 to combustor 101 is a preferred mode of operation which reduces the formation of nitrogen oxides during combustion and allows the most efficient operation of the integrated combustion turbine and cryogenic air separation systems. Optionally, warmed nitrogen 39 can be used for another purpose rather than returned to combustor 101; this option could be utilized for example if fuel 1 were moisturized low BTU synthesis gas from a coal gasification system. Optionally and preferably, a portion 41 of the nitrogen from compressor 141 is cooled in cooler 143 and further cooled against warming streams in heat exchanger 117 to provide cold recycled nitrogen-rich stream 29 which is throttled and introduced into higher pressure column 123 as earlier described.

High purity nitrogen 43 containing less than 0.2 mole % oxygen is withdrawn from higher pressure distillation column 123 and condensed in reboiler-condenser 125 against boiling liquid oxygen in the bottom of lower pressure column 119. A portion of the resulting liquid nitrogen provides reflux to higher pressure column 123 and the remaining liquid nitrogen 45 is optionally pumped to a pressure of 50 to 490 psia by pump 145. Pressurized liquid nitrogen 47 is warmed and vaporized against cooling streams in heat exchanger 117 to provide high pressure nitrogen product 49. In a preferred mode of operation when high pressure nitrogen product is required, liquid nitrogen 45 is pumped to a supercritical pressure by pump 145, and supercritical fluid 47 is warmed in heat exchanger 117 to provide high pressure nitrogen product 49 at 490 psia or above.

Liquid oxygen 51 containing less than 15 mole % nitrogen is withdrawn from the bottom of lower pressure column 119 and optionally pumped to a pressure of 80 to 250 psia in pump 147. Pressurized liquid oxygen 53 is warmed and vaporized against cooling streams in heat exchanger 117 to yield gaseous oxygen product 54 which optionally is compressed to 120 to 2000 psia in compressor 149 to provide high pressure oxygen product 55.

The alternative to withdrawing and pumping liquid nitrogen 45 is to withdraw nitrogen as vapor and/or liquid from the top of higher pressure column 123, as stream 45 or as a portion of vapor stream 43, and warm the withdrawn stream in heat exchanger 117. A nitrogen product compressor (not shown) would be needed to provide a high pressure nitrogen product equivalent to nitrogen product 49 in FIG. 1. In another alternative, oxygen is withdrawn as a vapor from the bottom of the lower pressure column (not shown) and the withdrawn vapor is warmed in heat exchanger 117 and compressed if necessary in compressor 149. In this alternative, compressor 149 would require more stages and consume more power to provide high pressure oxygen product 55 than in the earlier described mode in which liquid oxygen is withdrawn and pressurized by pump 147 before vaporization. In contrast with these two alternatives, a preferred embodiment of the invention utilizes the optional pumping of both liquid oxygen and liquid nitrogen as described above. Pumping the liquid products has the advantage of eliminating or reducing warm product compression, which in certain cases will reduce the total air separation power consumption, and the advantage of maintaining improved operating stability compared to full product compression.

Figure 2:
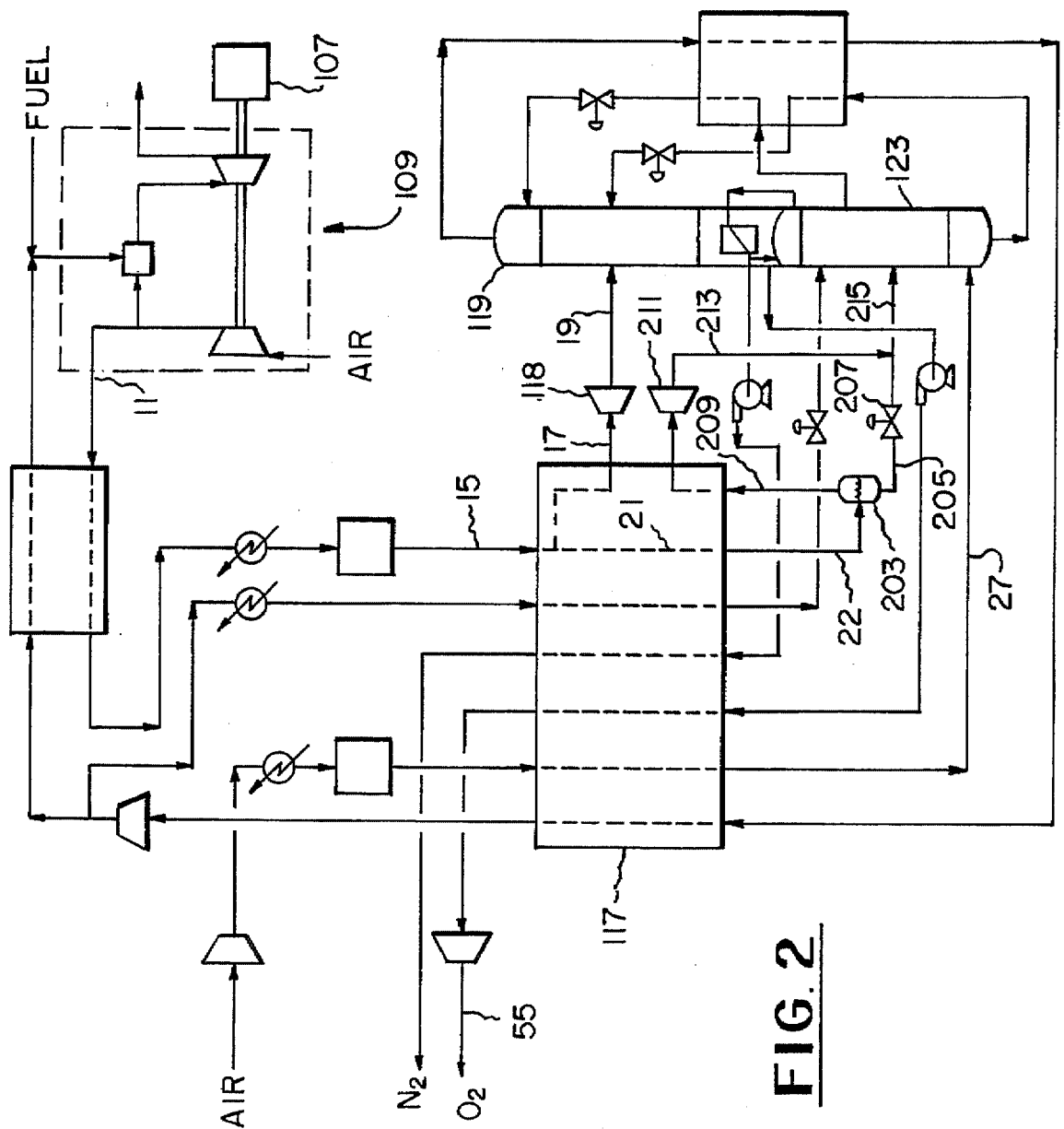
FIG. 2 is a schematic flow diagram of a second embodiment of the present invention.

Under certain operating conditions, cooled air 22 is partially condensed and it is desirable to separate the two-phase stream into vapor and liquid before expansion. This alternative is shown in FIG. 2; as in the embodiment of FIG. 1, a portion 17 of cooled and purified air 15 is work expanded in expander 118 and the resulting expanded cooled stream 19 is fed to lower pressure column 119. The remainder 21, however, is only partially condensed in heat exchanger 117 and the resulting two-phase stream 22 is separated in separator 203. Liquid 205 is reduced in pressure across throttling valve 207. Vapor 209 is warmed slightly, work-expanded in expander 211, the resulting cooled work-expanded stream 213 is combined with the reduced-pressure stream from throttling valve 207, and the combined stream 215 is introduced into higher pressure column 123.

This alternative is useful when the flow rate of purified air 15 varies significantly and/or periodically over time. This embodiment is particularly useful in a gasification combined cycle (GCC) power generation system in which oxygen product 55 is used in a coal gasification system to produce fuel 1 to operate combustion turbine system 109. In a GCC system, the available flow of extracted air 11 typically is reduced during periods of increased demand for power from electric generator 107 and during periods of increased ambient temperature. In such a situation, stream 22 would be fully condensed and no vapor 209 would be available to expander 211, and therefore this expander would not be operated. Alternatively, the available flow of extracted air 11 increases during periods of decreased demand for power from electric generator 107 and/or during periods of decreased ambient temperature. In such a situation, stream 22 would be partially condensed and vapor 209 would be work expanded in expander 211, thereby yielding additional refrigeration for higher pressure column 123. This in turn allows increased production of liquid products as described below.

Figure 3:
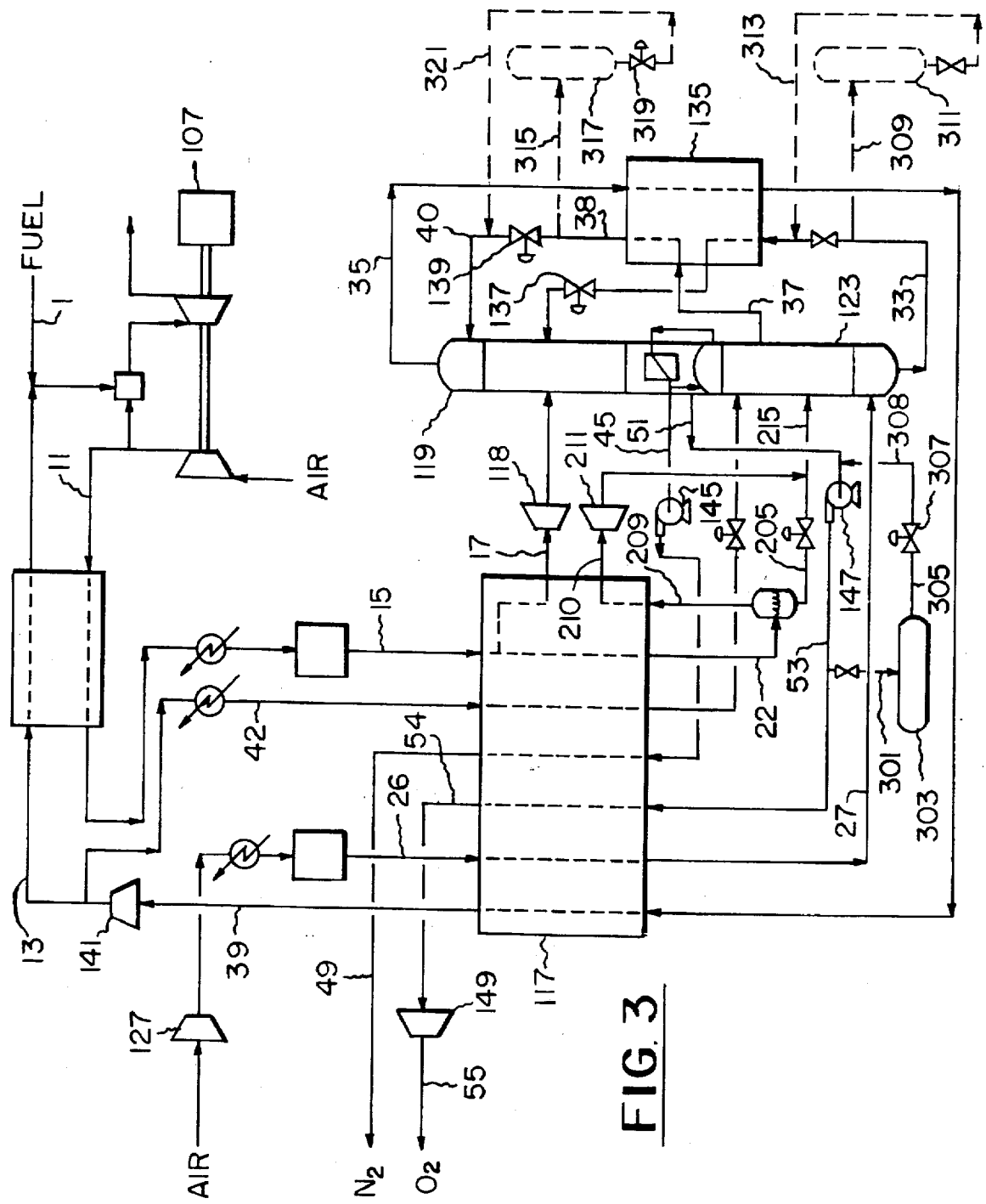
FIG. 3 is a schematic flow diagram of a third embodiment of the present invention.

The option to operate expander 211 during periods of increased availability of extracted air 11 is an important feature of the invention, and preferably is utilized with the additional features of the embodiment illustrated in FIG. 3. During periods of low ambient temperature and reduced power demand, which typically occur at night, air stream 22 is only partially condensed and vapor 209 is work expanded in expander 211 as earlier described. During this period, the resulting increased refrigeration allows the storage of liquid oxygen, which is withdrawn as liquid stream 51 and pumped to yield pressurized liquid oxygen 53. A portion 301 of this liquid is withdrawn and stored in storage vessel 303. Subsequently, during periods of increased power demand (and therefore increased demand for oxygen product 55 and decreased availability of extracted air 11), liquid oxygen 305 is withdrawn from storage vessel 303, reduced in pressure across valve 307, and introduced into the suction of pump 147. A portion of liquid oxygen 305 can be withdrawn as a liquid product if desired (not shown). During this period, as earlier described, expander 211 is not operated; in addition, operation of expander 118 may not be needed, and all air feed to the air separation system would be provided by streams 27 and 215.

In an alternative method of liquid storage during periods of low oxygen production and power demand, a portion 309 of crude liquid oxygen 33 is withdrawn and stored in storage vessel 311. Subsequently, during periods of increased power demand (and therefore increased demand for oxygen product 54 or 55 and decreased availability of extracted air 11), crude liquid oxygen 313 is withdrawn from storage vessel 311, combined with crude liquid oxygen 33, cooled in heat exchanger 135, reduced in pressure across valve 137, and introduced into lower pressure column 119. Additional liquid oxygen 51 then can be withdrawn therefrom. This alternative is particularly useful if the ratio of product oxygen 55 to return nitrogen 13 must remain constant.

In another alternative method of liquid storage during periods of low oxygen production and power demand, a portion 315 of liquid nitrogen 38 is withdrawn and stored in storage vessel 317. Subsequently, during periods of increased power demand (and therefore increased demand for return nitrogen product 13 and decreased availability of extracted air 11), crude liquid nitrogen is withdrawn from storage vessel 317, throttled across valve 319, and reduced-pressure liquid 321 is combined with liquid nitrogen from throttling valve 139, and the combined nitrogen stream is introduced into lower pressure column 119. This additional nitrogen supplied to lower pressure column 119 enables the withdrawal of additional nitrogen 35 from lower pressure column 119 thereby yielding an increased flow of return nitrogen 13. This alternative is particularly useful if the air separation system is sized for nitrogen production rather than oxygen production.

This cyclic use of stored cryogenic liquids (high purity oxygen, crude oxygen, or nitrogen) allows the air separation system to operate at lower power consumption during periods of high oxygen or nitrogen demand, since the system (particularly main air compressor 127) can be sized for average gas production rates rather than peak production rates. This reduces the compressor capital cost as well as the overall total and maximum power consumption of the air separation system and is particularly useful when peak power is valued significantly above normal (average) power.

Figure 4:
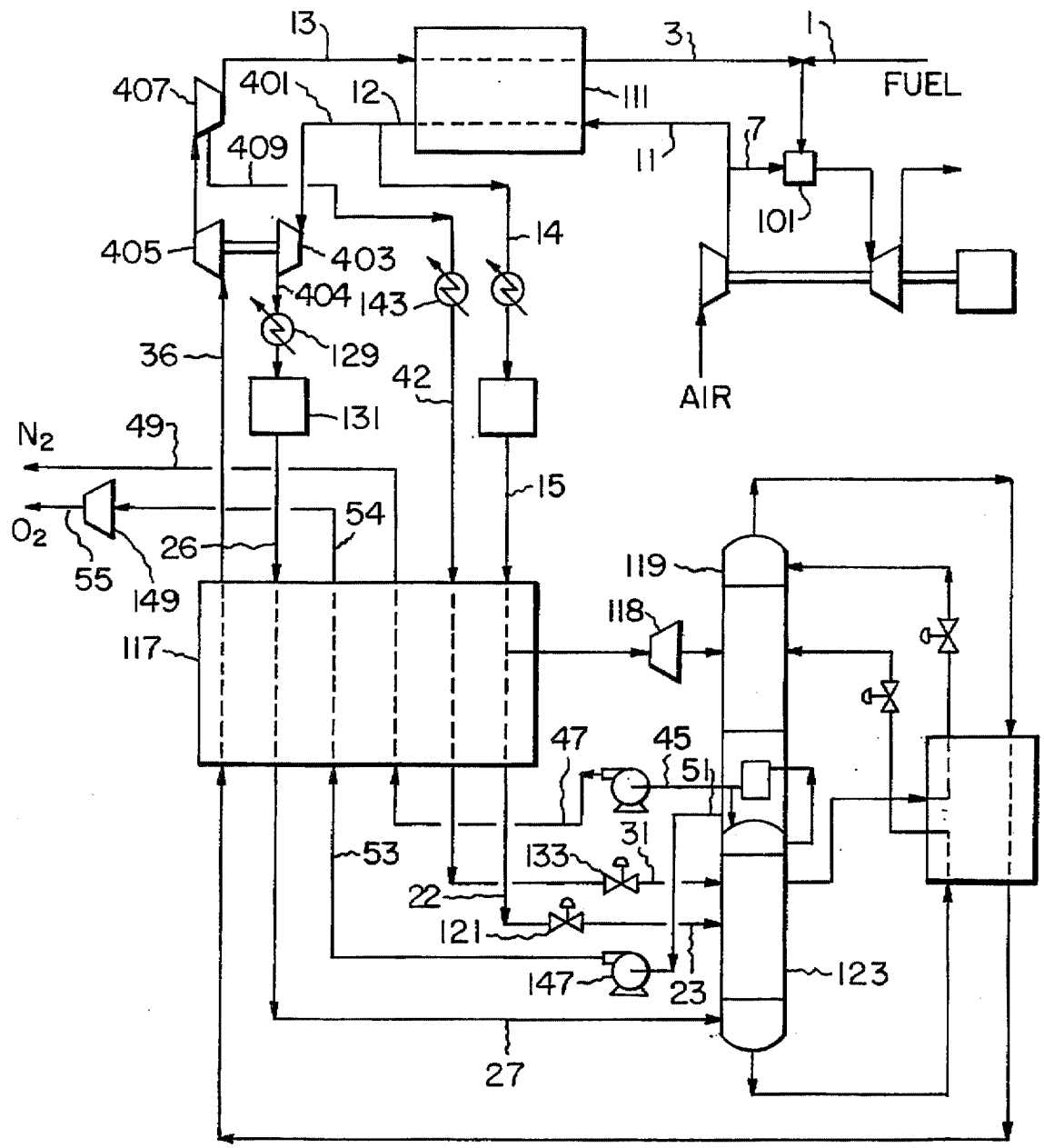
FIG. 4 is a schematic flow diagram of a fourth embodiment of the present invention.

An alternative embodiment of the invention is illustrated in FIG. 4 wherein a portion 401 of cooled extracted air 412 from heat exchanger 111 is work expanded in expander 403, further cooled in cooler 129, and treated in purification system 131 to remove water, carbon dioxide, and other components which could freeze out at cryogenic temperatures. Purified air 26 is further cooled against warming streams in heat exchanger 117, and purified cooled air stream 27 is introduced into higher pressure distillation column 123. The remaining portion 14 of extracted air 412 provides feed to distillation columns 119 and 123 as earlier described. This alternative embodiment is similar to the embodiment of FIG. 1 except that the air to cooler 129 is provided by expanded extracted air from expander 403 (FIG. 4) rather than by air from main air compressor 127 (FIG. 1).

Expansion turbine 403 is coupled with and drives compressor 405 which compresses return nitrogen 36 to an intermediate pressure of 100 to 200 psia, which is further compressed in compressor 407 to yield compressed return nitrogen 13 which is warmed in heat exchanger 111, combined with fuel 1, and introduced into combustor 101 as previously described. Interstage nitrogen stream 409 is withdrawn from compressor 407, cooled in cooler 143 and heat exchanger 117, and reduced in pressure across throttling valve 133 to provide cold nitrogen recycle stream 31 to higher pressure distillation column 123. This in turn yields a higher purity in nitrogen product stream 45 withdrawn from higher pressure column 123. This embodiment is similar to the embodiments of FIGS. 1–3 except that a portion of the power to compress recycle nitrogen 409 (identical to nitrogen 41 of FIG. 1) is provided by expander 403 which operates compressor 405. This embodiment of the invention is possible because of a key feature of the present invention, namely, that higher pressure distillation column 123 operates at a pressure below that of extracted air 412 or 401. Thus expander 403 operates in combination with throttling valve 121 to provide feed air streams 23 and 27 to higher pressure distillation column 123. In addition, work recovered by expander 403 reduces the work of compression required for return nitrogen 13 and recycle nitrogen 409, so that the power consumed by compressor 407 of FIG. 4 is significantly less than that of compressor 141 in FIG. 1.

Figure 6:
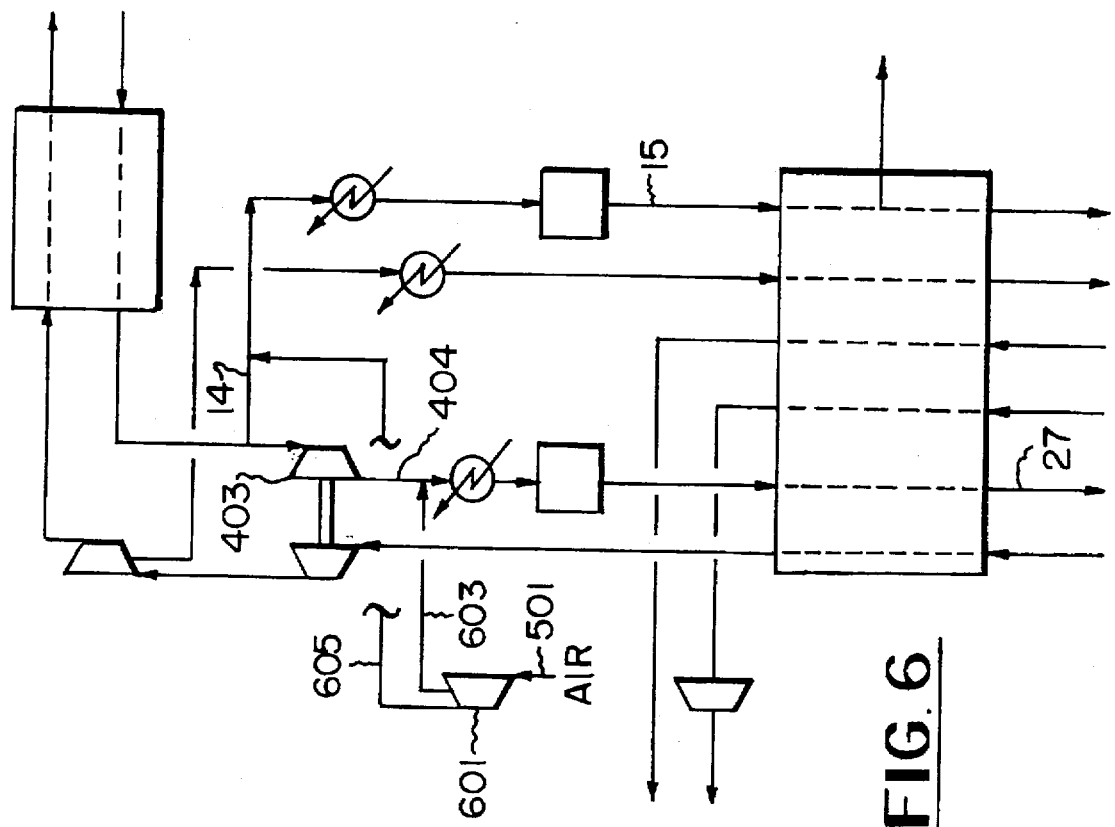
FIG. 6 is a schematic flow diagram illustrating an alternative supplemental air feed for the fourth embodiment of the present invention.
Figure 5:
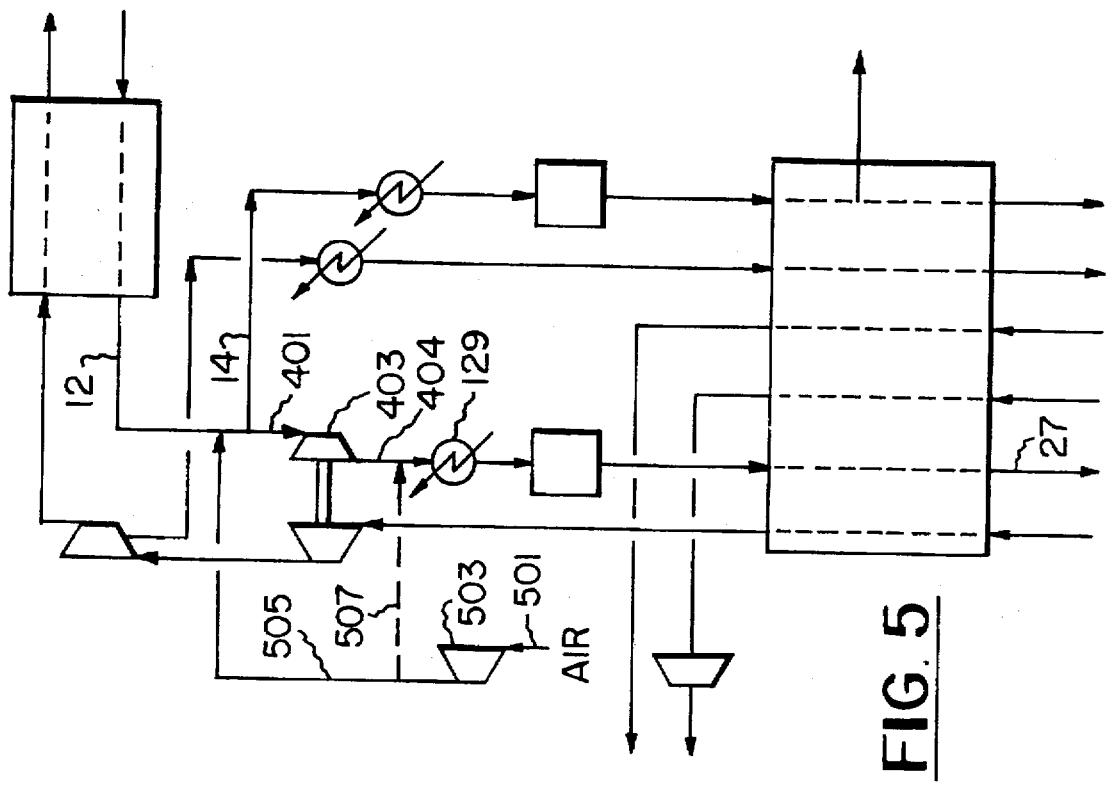
FIG. 5 is a schematic flow diagram illustrating a supplemental air feed for the fourth embodiment of the present invention.

In the embodiment of FIG. 4 described above, all feed air for the air separation system is provided by extracted air 412. Under certain design conditions, additional feed air will be required to supplement extracted air 412 when a higher flow of compressed air 7 is needed in combustor 101. This can be accomplished in an alternative mode described in FIG. 5 wherein supplemental air 501 is compressed by compressor 503 and the resulting supplemental compressed air 505 is combined with extracted air 412 prior to division into air feed streams 14 and 401. Compressor 503 in this case is preferably an adiabatic compressor, although an intercooled compressor can be used if desired. Alternatively, air 501 can be compressed to a lower pressure as stream 507 and combined with expanded air 404 from expander 403 prior to cooler 129. In this mode supplemental air is provided only to high pressure distillation column 123 as feed stream 27. Another alternative mode is shown in FIG. 6 wherein air 501 is compressed by multistage compressor 601; interstage compressed air 603 is withdrawn at an intermediate pressure and combined with the discharge air stream 404 from expander 403. The combined air stream is processed as earlier described to provide air feed 27 to higher pressure distillation column 123. Additional compressed air 605 is withdrawn from the last stage of compressor 601 and combined with extracted air 14 to provide air feed 15 for cooling, expansion, and introduction into distillation columns 119 and 123 as earlier described. Compressor 601 can be either an adiabatic or an intercooled compressor.

In the embodiments described above with reference to FIGS. 1 through 6, coolers 113, 129, and 143 are used to cool gas streams after compression. Cooling duty in these coolers is typically provided by indirect heat exchange with water. The heat recovered in the water discharged from these coolers can be used elsewhere in the combustion turbine/air separation process. Such uses include moisturization of return nitrogen 3 and/or fuel gas 1 prior to introduction into combustor 101, preheating boiler feedwater, and heating adsorber regeneration gas for gas purification systems 115 and 131.

EXAMPLE 1

A process heat and material balance was prepared for the embodiment of the invention described in FIG. 1 in which extracted air 11 from high pressure combustion turbine 109 is available at 348 psia and 750° F. which supplies purified air feed 15 at 338 psia. The ambient temperature is 95° F. Higher pressure distillation column 123 and lower pressure distillation column 119 operate at average pressures of 185 and 63 psia respectively. Liquid oxygen 51 is pumped to 152 psia, vaporized, and compressed to 43 psia to yield oxygen product 55. Liquid nitrogen 45 is pumped to 998 psia and vaporized to provide nitrogen product 49 at 991 psia. Return nitrogen 39 contains 0.86 mole % oxygen. A stream summary of the heat and material balance is summarized in Table 1.

Figure 7:
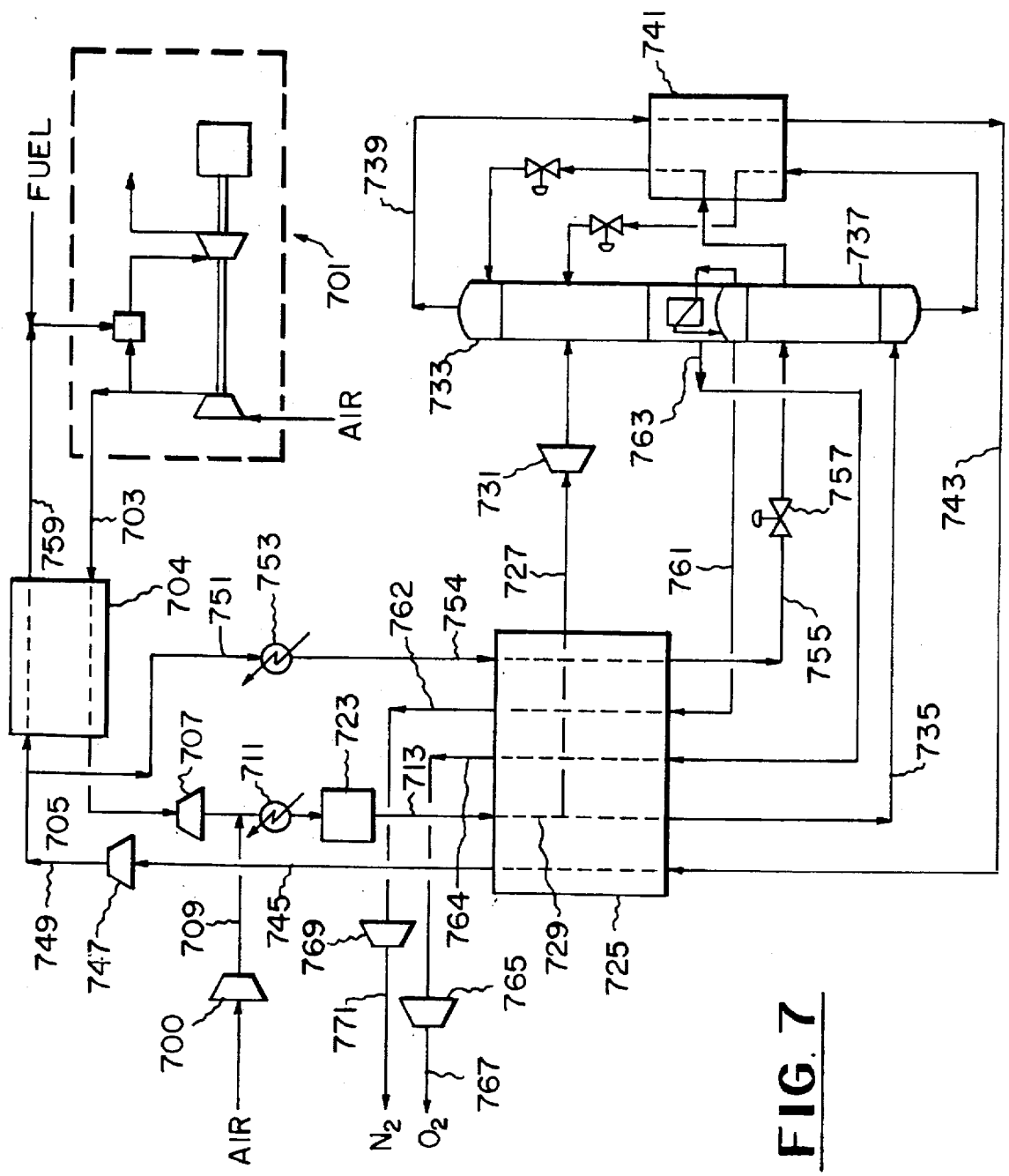
FIG. 7 is a schematic flow diagram illustrating a conventional method of integrating a combustion turbine and an air separation system.

FIG. 7 illustrates a double column air separation system which is integrated with a combustion turbine in a manner which utilizes several features known in the art. Combustion turbine 701 is identical to combustion turbine 109 of FIG. 1 and provides extracted air 703 at 348 psia. In the conventional air separation system of FIG. 7, cooled extracted air 705 is expanded, combined with supplemental compressed air 709 from compressor 700, cooled in cooler 711, and purified in purification system 723 to remove condensable contaminants. Purified air 713 at 190 psia is further cooled in heat exchanger 725, and a portion 727 of cooled air 729 is work expanded in expander 731 and introduced directly into lower pressure distillation column 733. The remainder of the feed air is further cooled to yield cold feed air 735 which is introduced into higher pressure distillation column 737. Nitrogen 739 is withdrawn from lower pressure column 733, warmed in heat exchangers 741 and 725, and compressed by compressor 747 to yield return nitrogen 749. A portion thereof is warmed against extracted air in heat exchanger 704 and introduced into the combustor of combustion turbine 701. The remainder 751 of the return nitrogen 749 is cooled in cooler 753 and heat exchanger 725, and cooled nitrogen 755 is reduced in pressure across throttling valve 757 and introduced into higher pressure distillation column 737. Liquid oxygen 763 is withdrawn, vaporized in heat exchanger 725, and the vaporized oxygen 764 is compressed in compressor 765 to yield oxygen product 767 at 743 psia. Nitrogen vapor 761 is withdrawn and warmed in heat exchanger 725, and warm nitrogen 762 is compressed in compressor 769 to yield nitrogen product 771 at 993 psia.

TABLE 1

Stream Properties for Example 1 (FIG. 1)
(95° F. Ambient)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 15 | 338 | 80 | 6842 | V | 78.12 | 0.93 | 20.95 |
| 17 | 335 | −187 | 1772 | V | 78.12 | 0.93 | 20.95 |
| 22 | 333 | −247 | 5070 | L | 78.12 | 0.93 | 20.95 |
| 26 | 190 | 80 | 18783 | V | 78.12 | 0.93 | 20.95 |
| 39 | 60 | 75 | 22419 | V | 98.78 | 0.36 | 0.86 |
| 42 | 388 | 80 | 4125 | V | 98.78 | 0.36 | 0.86 |
| 47 | 998 | −254 | 1848 | L | 99.85 | 0.05 | 0.10 |
| 48 | 993 | 75 | 1848 | V | 99.85 | 0.05 | 0.10 |
| 53 | 152 | −267 | 5483 | L | 1.87 | 3.13 | 95.00 |
| 54 | 147 | 75 | 5483 | V | 1.87 | 3.13 | 95.00 |
| 55 | 743 | 269 | 5483 | V | 1.87 | 3.13 | 95.00 |

A heat and material balance was carried out to illustrate the process described above with reference to FIG. 7, and the results are given in Table 2. The conventional air separation system of FIG. 7 produces the same oxygen and nitrogen products as the embodiment of the present invention in FIG. 1.

The relative power consumption of the air separation processes on FIGS. 1 and 7 were calculated and are compared in Table 3 for an ambient air temperature of 95° F. and full design load on the combustion turbine and air separation system. Relative power was calculated and normalized for each individual compressor and expander. The values of the overall relative power consumption were normalized based on the actual total power consumption of the compressors and expanders. The results show that the air separation method of the present invention of FIG. 1 uses an average total power which is 1.3% less than that of the conventional method of FIG. 7 at these conditions.

TABLE 2

Stream Properties for Example 1 (FIG. 7)
(95° F. Ambient)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 709 (a) | 192 | 80 | 18967 | V | 77.35 | 0.92 | 20.74 |
| 713 | 190 | 80 | 25619 | V | 78.12 | 0.93 | 20.95 |
| 727 | 187 | −226 | 1288 | V | 78.12 | 0.93 | 20.95 |

TABLE 2-continued

Stream Properties for Example 1 (FIG. 7)
(95° F. Ambient)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 735 | 185 | −238 | 24331 | V | 78.12 | 0.93 | 20.95 |
| 745 | 58 | 75 | 20185 | V | 98.70 | 0.44 | 0.86 |
| 754 | 388 | 80 | 1896 | V | 98.70 | 0.44 | 0.86 |
| 761 | 185 | −266 | 1848 | V | 99.83 | 0.07 | 0.10 |
| 762 | 180 | 75 | 1848 | V | 99.83 | 0.07 | 0.10 |
| 763 | 64 | −268 | 5482 | V | 2.13 | 2.87 | 95.00 |
| 764 | 59 | 75 | 5482 | V | 2.13 | 2.87 | 95.00 |
| 767 | 743 | 193 | 5482 | V | 2.13 | 2.87 | 95.00 |
| 771 | 987 | 80 | 1848 | V | 99.83 | 0.07 | 0.10 |

(a) contains 0.99 mole % water

TABLE 3

Air Separation Relative Power Consumption
Example 1
(95° F. Ambient)

| | Present Invention (FIG. 1) | Conventional (FIG. 7) |
|---|---|---|
| Main Air Compressor (127, 700) | 1.000 | 1.000 |
| GOX Compressor (149, 765) | 0.653 | 1.000 |
| Return N2 Compressor (141, 747) | 1.000 | 0.914 |
| Pure N2 Compressor (759) | | 1.000 |
| LOX Pump (147) | 1.000 | |
| LIN Pump (145) | 1.000 | |
| Cooled Air Exp. (118, 731) | 1.000 | 0.452 |
| Hot Extr. Air Exp. (707) | | 1.000 |
| Net Overall Relative Power Consumption | 0.987 | 1.000 |

Further relative power calculations were carried out for a lower ambient temperature of 41° F. for both full combustion turbine design load and a turndown condition of 86.8% of design, and the results are summarized in Table 4.

TABLE 4

Air Separation Relative Power Consumption for Example 1
(41° F. Ambient)

| | Present Invention (FIG. 1) | Conventional Integration (FIG. 7) |
|---|---|---|
| Full Design Flow | 1.0127 | 1.0000 |
| Turndown (86.8% of Design) | 0.8140 | 0.8110 |

It is seen that the power consumption of the present invention and the conventional process are about equal at turndown, while at full design load the present invention has a 1.27% power disadvantage. The significant advantage of the present invention over the conventional process of FIG. 7 is the elimination of air expander 707 and nitrogen compressor 769. In addition, oxygen compressor 149 of FIG. 1 is simpler machine with a lower compression ratio than compressor 765 of FIG. 7. While the invention in FIG. 1 requires two air purification units 115 and 131, this is not a serious disadvantage since multiple parallel purification units are generally required for large integrated combustion turbine/air separation systems.

EXAMPLE 2

The embodiment of FIG. 3 is operated in a gasification combined cycle power generation system through diurnal ambient temperature swings and variations in electric power demand. Oxygen 55 is used in a coal gasification system (not shown) to generate fuel 1. During nighttime operation the ambient air temperature is lower and the demand for power from generator 107 is reduced. For the purposes of this Example, a nighttime temperature of 41° F. is assumed for a period of 10 hours, and at these conditions extracted air 11 at 343 psia supplies 41.3% of the feed air required for the air separation system; the remainder is supplied by main air compressor 127. The air separation system produces 2000 tons/day of contained oxygen 51 at a purity of 95 mole %. Oxygen gas 55 at 743 psia containing 1960 tons/day of oxygen is utilized in the coal gasification system (not shown), and the remaining 40 tons/day is stored in storage vessel 303 for 10 hours. A portion 17 of the extracted air is expanded in expander 118 and fed to lower pressure distillation column 119, and the remaining portion 22 is partially condensed and separated into liquid 205 and vapor 209. Liquid 205 is throttled into high pressure column 123; vapor 209 is partly warmed, expanded in expander 211, and fed to lower pressure distillation column 119. The refrigeration generated by expander 211 allows the condensation of additional liquid oxygen during nighttime operation for storage as described above.

A heat and material balance was carried out for nighttime operation (41° F.) of the invention as described according to FIG. 3 and the results are summarized in Table 5. For comparison purposes, a heat and material balance was carried out for identical product requirements using the embodiment of FIG. 2 in which no liquid oxygen is stored during nighttime operation, and the results are summarized in Table 6.

TABLE 5

Stream Properties for Example 2
(FIG. 3 - Stored Liquid Oxygen)
(41° F. Ambient)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 15 | 338 | 80 | 10580 | V | 78.12 | 0.93 | 20.95 |
| 17 | 335 | −187 | 1516 | V | 78.12 | 0.93 | 20.95 |
| 26 | 190 | 80 | 15037 | V | 78.12 | 0.93 | 20.95 |
| 39 | 60 | 75 | 22565 | V | 98.77 | 0.37 | 0.86 |
| 42 | 388 | 80 | 4278 | V | 98.77 | 0.37 | 0.86 |
| 49 | 993 | 75 | 1848 | V | 99.84 | 0.06 | 0.10 |
| 54 | 147 | 75 | 5373 | V | 74.68 | 3.10 | 95.00 |
| 55 | 743 | 269 | 5373 | V | 1.90 | 3.10 | 95.00 |
| 205 | 333 | −240 | 4917 | L | 1.90 | 1.04 | 24.28 |
| 210 | 333 | −240 | 4146 | V | 82.20 | 0.80 | 17.00 |
| 301 | 152 | −267 | 110 | L | 1.90 | 3.10 | 95.00 |

TABLE 6

Stream Properties for Example 2
(FIG. 1 - No Stored Liquid Oxygen)
(41° F. Ambient)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 15 | 338 | 80 | 10578 | V | 78.12 | 0.93 | 20.95 |
| 17 | 335 | −187 | 1553 | V | 78.12 | 0.93 | 20.95 |

TABLE 6-continued

Stream Properties for Example 2
(FIG. 1 - No Stored Liquid Oxygen)
(41° F. Ambient)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 22 | 333 | −240 | 3741 | V | 82.47 | 0.79 | 16.74 |
| 22 | 333 | −240 | 5285 | L | 75.04 | 1.03 | 23.93 |
| 26 | 190 | 80 | 15035 | V | 78.12 | 0.93 | 20.95 |
| 39 | 60 | 75 | 22586 | V | 98.78 | 0.37 | 0.85 |
| 42 | 388 | 80 | 4303 | V | 98.78 | 0.37 | 0.85 |
| 49 | 993 | 75 | 1848 | V | 99.84 | 0.06 | 0.10 |
| 54 | 147 | 75 | 5482 | V | 1.90 | 3.10 | 95.00 |
| 55 | 743 | 269 | 5482 | V | 1.90 | 3.10 | 95.00 |

During the daytime hours, both the ambient temperature and the demand for electric power increase. The power consumption for the air separation system is at a maximum during this period, and the amount of available extracted air 11 is reduced. In this Example, the embodiment of FIG. 3 is operated at 70° F. for 5 hours, during which time extracted air 11 supplies 27.4% of the air feed required by the air separation system and the remainder is supplied by main air compressor 127. Operating pressures are identical to those described above for nighttime operation. Liquid oxygen 51 is withdrawn at the rate of 1920 tons/day from lower pressure column 119 and is supplemented by withdrawing stored liquid oxygen 305 at a rate of 80 tons/day to provide a total contained oxygen product 55 at a rate of 2000 tons/day. During this period, expanders 118 and 211 may be idled since the available amount of feed air 15 is decreased and the additional liquid oxygen vaporizing in heat exchanger 117 provides sufficient refrigeration. At these conditions, extracted air 15 is totally condensed and fed to higher pressure column 123 as a liquid feed 215.

A heat and material balance was carried out for daytime operation (70° F.) of the invention as described according to FIG. 3 and the results are summarized in Table 7. For comparison purposes, a heat and material balance was carried out for identical product requirements using the embodiment of FIG. 1 in which no liquid oxygen was stored during nighttime operation, and the results are summarized in Table 8.

TABLE 7

Stream Properties for Example 2
(FIG. 3 - Stored Liquid Oxygen)
(70° F. Ambient)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 15 | 338 | 80 | 6736 | V | 78.12 | 0.93 | 20.95 |
| 26 | 190 | 80 | 17852 | V | 78.12 | 0.93 | 20.95 |
| 39 | 60 | 75 | 20648 | V | 98.80 | 0.37 | 0.85 |
| 42 | 388 | 80 | 3172 | V | 98.80 | 0.37 | 0.85 |
| 49 | 993 | 75 | 1848 | V | 99.85 | 0.05 | 0.10 |
| 54 | 147 | 75 | 5482 | V | 1.82 | 3.18 | 95.00 |
| 55 | 743 | 269 | 5482 | V | 1.82 | 3.18 | 95.00 |
| 205 | 333 | −244 | 6736 | L | 78.12 | 0.93 | 20.95 |
| 305 | 152 | −244 | 219 | L | 1.82 | 3.18 | 95 |

TABLE 8

Stream Properties for Example 2
(FIG. 1 - No Stored Liquid Oxygen)
(70° F. Ambient)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 15 | 338 | 80 | 6736 | V | 78.12 | 0.93 | 20.95 |
| 17 | 335 | −187 | 1777 | V | 78.12 | 0.93 | 20.95 |
| 22 | 333 | −247 | 4959 | L | 78.12 | 0.93 | 20.95 |
| 26 | 190 | 80 | 18877 | V | 78.12 | 0.93 | 20.95 |
| 39 | 60 | 75 | 22419 | V | 98.79 | 0.36 | 0.85 |
| 42 | 388 | 80 | 4137 | V | 98.79 | 0.36 | 0.85 |
| 49 | 993 | 75 | 1848 | V | 99.85 | 0.05 | 0.10 |
| 54 | 147 | 75 | 5482 | L | 1.87 | 3.13 | 95.00 |
| 55 | 743 | 269 | 5482 | V | 1.87 | 3.13 | 95.00 |

The relative power consumption of the air separation processes of FIGS. 1 and 3 were calculated and are compared in Table 9 for operation at ambient air temperatures of 41° F. and 70° F. as described above. Relative power was calculated and normalized for each individual compressor and expander. The overall relative power consumptions were normalized based on the actual total power consumptions of the compressors and expanders. Since the daytime operation sets the required design capacity for main air compressor 127, the embodiment of FIG. 3 allows the use of a smaller compressor (5.4% lower design capacity) and the overall power consumption during daytime operation is thus reduced. It is seen from Table 9 that the use of nighttime oxygen storage of FIG. 3 results in reduced air separation power consumption during the two operating periods described above. The total overall average power calculated for a 24 hour period is 1.4% less using the liquid oxygen storage embodiment of FIG. 3 compared with operation without this feature as shown in FIG. 1.

The storage of cryogenic liquids during periods of low power demand (e.g. nighttime) as described above is essentially a form of energy storage. The use of this stored energy during periods of high power demand (e.g. daytime) is especially advantageous because the value of electric power during such periods may be higher than the value during periods of low power demand.

TABLE 9

Air Separation Relative Power Consumption
(Example 2)

| | 41° F. Ambient | | 70° F. Ambient | |
|---|---|---|---|---|
| | FIG. 3 (Stored LOX) | FIG. 3 (No Stored LOX) | FIG. 3 (Stored LOX) | FIG. 1 (No Stored LOX) |
| Main Air Compressor (127) | 0.786 | 0.785 | 0.946 | 1.000 |
| GOX Compressor (149) | 0.980 | 1.000 | 1.000 | 1.000 |
| Return N2 Compressor (141) | 0.999 | 1.000 | 0.915 | 0.993 |
| LOX PUMP (147) | 1.000 | 1.000 | 1.000 | 1.000 |
| LIN Pump (145) | 1.000 | 1.000 | 1.000 | 1.000 |
| Expander 1 (118) | 0.855 | 0.876 | | 1.000 |
| Expander 2 (211) | 1.000 | | | |
| Net Overall Relative Power Consumption | 0.899 | 0.905 | 0.946 | 1.000 |

EXAMPLE 3

An embodiment of the invention is illustrated by the process of FIG. 4 without the use of liquid oxygen pump 147 and high pressure condensing air 22. In this embodiment, all of extracted air 15 is cooled and expanded through expander 118 into lower pressure column 119. Higher pressure distillation column 123 is operated at an optimum feed pressure of about 245 psia, and oxygen product 55 is provided at 855 psia by compressor 149. Gaseous nitrogen product 49 is provided at 1100 psia by pumping liquid nitrogen 45 to a supercritical pressure and warming the resulting pressurized fluid 47 in heat exchanger 117. By introducing nitrogen 47 into heat exchanger 117 as a supercritical fluid, more efficient heat exchange is realized therein since the resulting cooling curves for the exchanger are more parallel than would occur if subcritical liquid nitrogen were vaporized in the exchanger. A heat and material balance was carried out for this embodiment of the invention and the results are summarized in Table 10.

TABLE 10

Stream Properties for Example 3 (FIG. 4)

| Stream No. | Pressure (psia) | Temp. (Deg. F.) | Flow (lbmol/hr) | Phase | Composition (Mole %) | | |
|---|---|---|---|---|---|---|---|
| | | | | | N2 | Ar | O2 |
| 3 | 490.0 | 750.0 | 71.39 | V | 98.77 | 0.37 | 0.86 |
| 11 (a) | 450.0 | 800.0 | 101.00 | V | 77.35 | 0.92 | 20.74 |
| 15 | 435.0 | 80.0 | 6.91 | V | 78.12 | 0.93 | 20.95 |
| 26 | 245.0 | 80.0 | 93.09 | V | 78.12 | 0.93 | 20.95 |
| 27 | 242.3 | −239.3 | 93.09 | V | 78.12 | 0.93 | 20.95 |
| 31 | 240.4 | −239.6 | 24.90 | V | 98.77 | 0.37 | 0.86 |
| 36 | 81.5 | 75.0 | 96.29 | V | 98.77 | 0.37 | 0.86 |
| 42 | 245.4 | 80.0 | 24.90 | V | 98.77 | 0.37 | 0.86 |
| 45 | 240.0 | −257.8 | 7.21 | L | 99.84 | 0.06 | 0.10 |
| 47 | 1110.0 | −243.5 | 7.21 | L | 99.84 | 0.06 | 0.10 |
| 49 | 1101.0 | 80.0 | 7.21 | V | 99.84 | 0.06 | 0.10 |
| 53 | 86.9 | −259.8 | 21.4 | V | 1.90 | 3.10 | 95.00 |
| 54 | 81.9 | 75.0 | 21.4 | V | 1.90 | 3.10 | 95.00 |
| 55 | 855.0 | 220.7 | 21.4 | V | 1.90 | 3.10 | 95.00 |

(a) contains 0.99 mole % water

EXAMPLE 4

Mass and energy balances were calculated using the cycle and process conditions of Example 1 in which the oxygen concentration of return nitrogen 39 (FIG. 1) was varied from about 0.48 to about 1.05 mole % to determine the effect on the total relative power for the air separation process. The actual power at 1.05 mole % normalized and the total relative power at lower concentrations was determined on this basis.

Figure 8:
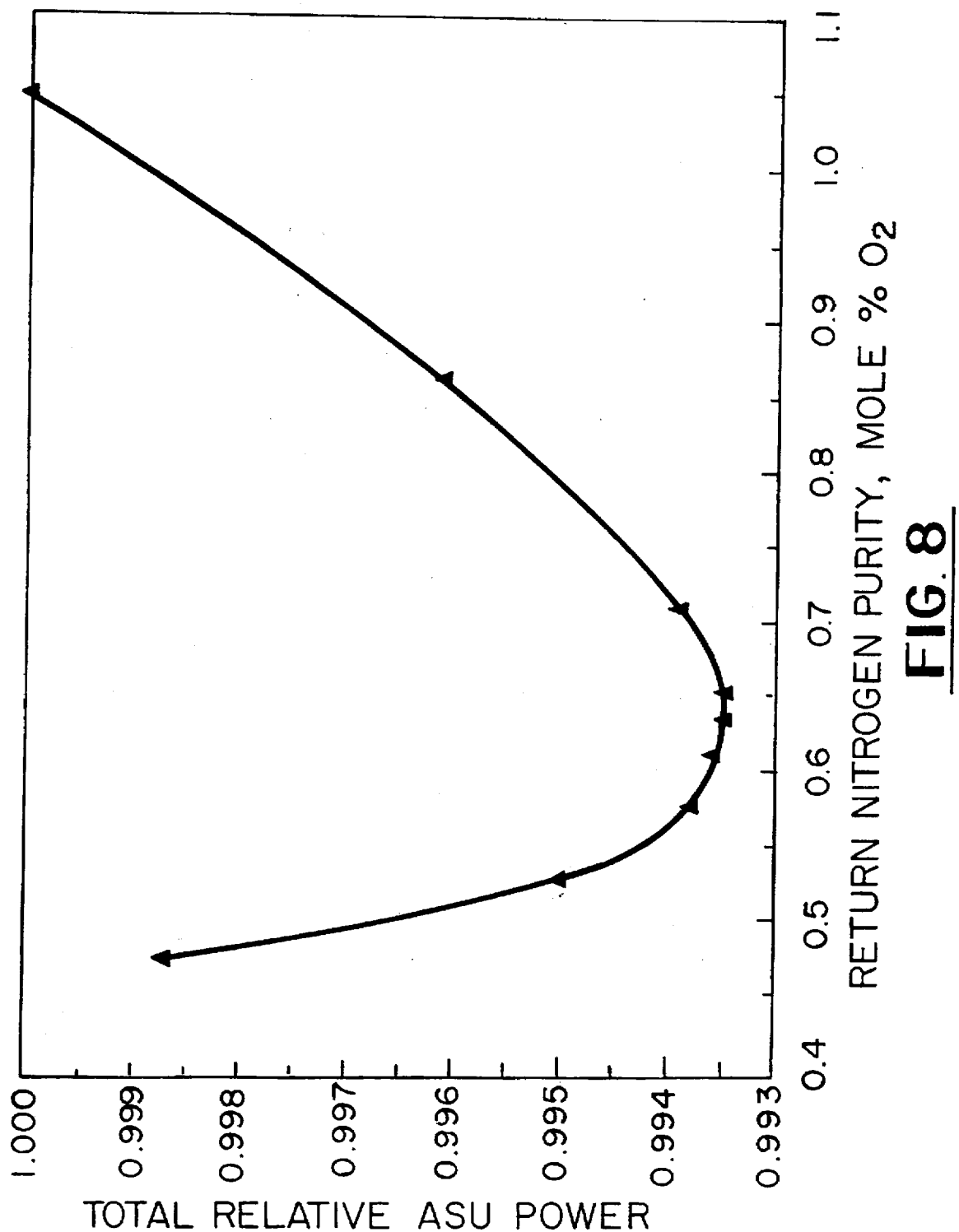
FIG. 8 is a plot of total relative ASU power vs. return nitrogen purity for operation of the present invention.

The results are given in FIG. 8 which illustrates the unexpected finding that the relative power passes through a minimum as a function of nitrogen purity. For the cycle and operating conditions of this Example, the process preferably is operated such that return nitrogen 39 contains between about 0.5 and 0.8 mole % oxygen. This finding is highly unexpected because in typical combined cycle power plants the operators specify a maximum of 1 to 2 mole % oxygen in the return nitrogen purity, and it is generally believed that higher purity return nitrogen would require higher power consumption by the air separation system. In the cycle of the present invention, a small increase in the flow of recycle nitrogen 41 to higher pressure column 123 has a significant effect on the purity of return nitrogen 39. Increasing the purity of return nitrogen 39 increases overall oxygen recovery and reduces the power of main air compressor 127 for a required production rate of oxygen product 55. The relative power according to FIG. 8 decreases as return nitrogen purity is reduced to an optimum of about 0.65 mole % oxygen.

EXAMPLE 5

Figure 9:
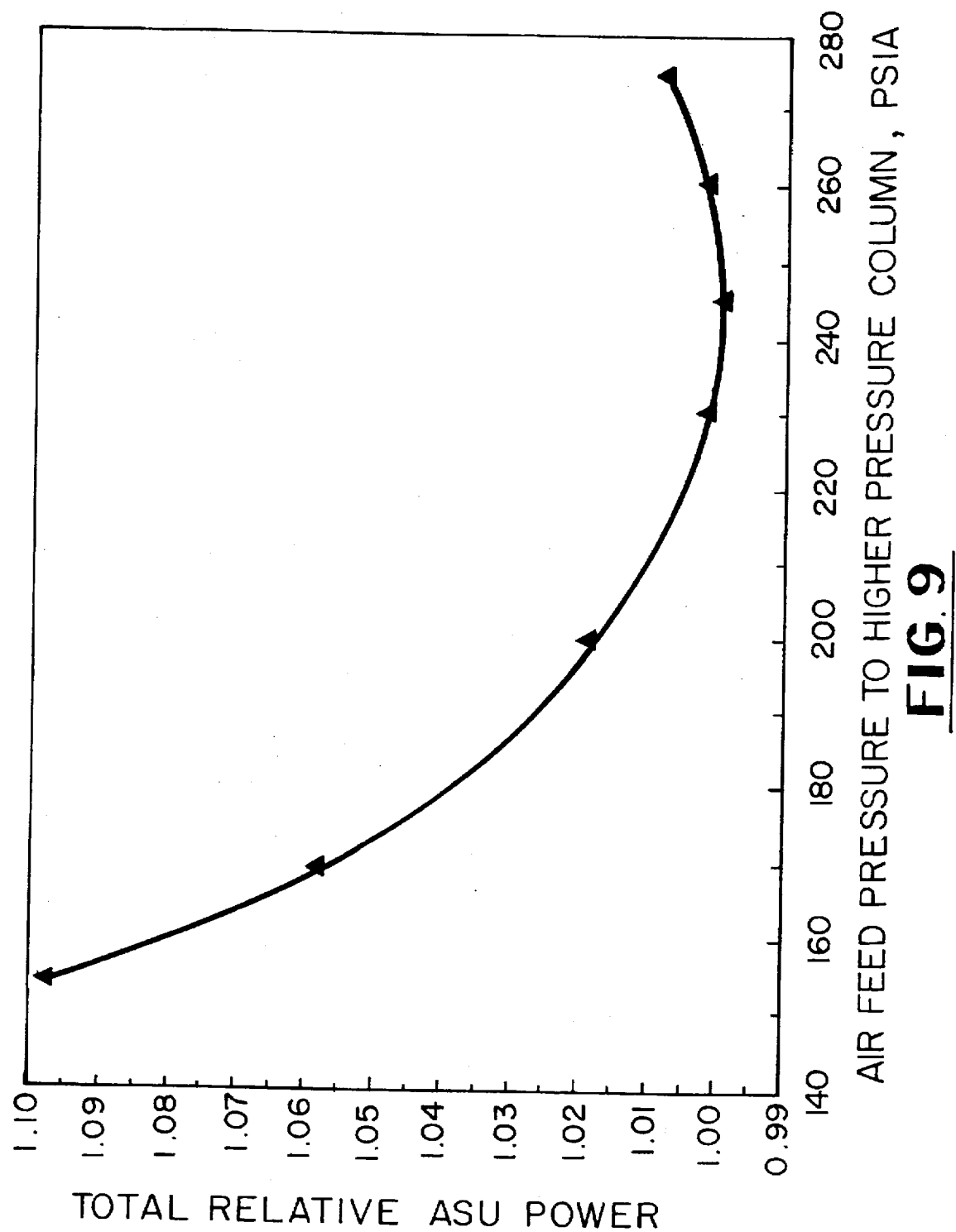
FIG. 9 is a plot of total relative ASU power vs. air feed pressure to the higher pressure column for operation of the present invention.

Mass and energy balances were calculated using the cycle and process conditions of Example 1 by varying the pressure of air feed 27 to higher pressure column 123 (FIG. 1) from about 155 to about 275 psia to determine the effect of this pressure on the total power for the air separation process. The pressures of air feed 23 and recycle nitrogen 31 are adjusted accordingly. The total power was calculated at several selected air feed pressures in this range and unexpectedly a minimum in the power vs. feed pressure was found at about 245 psia. The calculated power values were normalized to the minimum value and the results are given in FIG. 9 which illustrates the unexpected finding that the relative power passes through a minimum as a function of higher pressure column air feed pressure. For the cycle and operating parameters of this Example, the process preferably is operated at an optimum feed pressure to the higher pressure column in the range of about 190 to about 280 psia. This finding differs from prior art combustion turbine-air separation cycles in which the optimum pressure of the higher pressure column occurs at much lower pressures; with the cycle of U.S. Pat. No. 4,224,045, for example, this optimum occurs at about 150 psia.

Operating the higher pressure column at this optimum pressure according to the present invention yields the following advantages for integrated combustion turbine/air separation systems:

The distillation operating lines approach the equilibrium curve more closely which tends to increase the thermodynamic reversibility and the efficiency of the separation process.

Line sizes and valves are smaller, which reduces capital investment.

Product compression consumes less energy.

Overall cost of electricity from combustion turbine generators is reduced.

The key feature of the invention in all embodiments described above is that higher pressure distillation column 123 operates at a feed pressure significantly lower than the pressure of extracted air 11, preferably such that feed air 23 is introduced into higher pressure distillation column 123 at an absolute pressure which is about 20% to about 85% of the absolute pressure of extracted air 11 from combustion turbine air compressor 105. This important feature allows the air separation system to operate stably at constant pressures in which the pressure of higher pressure distillation column is below the minimum available pressure of extracted air 11 from combustion turbine compressor 105, which can vary considerably during part load operation of combustion turbine 109. In addition, constant pressure operation of the air separation system ensures that oxygen product compressor 149 and return nitrogen compressor 141 (or optionally return nitrogen compressors 405 and 407) operate at nearly constant suction pressure, which in turn allows the design of these compressors for narrower and more efficient ranges of operation. Unlike prior art teaching on integrated combustion turbine/air separation systems, the purified extracted air 15 of the present invention is introduced into the air separation distillation columns by cooling the entire stream to an intermediate temperature, withdrawing a portion for work expansion into lower pressure column 119, and further cooling the remaining air for pressure reduction into higher pressure column 123. The pressure reduction of cooled purified feed air 22 into higher pressure column 123 is a unique feature of the present invention which allows independent control of the feed pressures to lower pressure column 119 and higher pressure column 123. In addition, the feed pressures to both columns can be operated below but otherwise independent of the pressure of extracted air 11.

An important embodiment of the invention is the storage of selected cryogenic liquids during periods of low ambient temperature and/or low product demand. This embodiment preferably is utilized in conjunction with the pumping of liquid oxygen and/or liquid nitrogen before warming or vaporization to yield high pressure gas products. The combination of this embodiment with the key embodiment described above enables the highly efficient operation of an integrated air separation/combustion turbine system regardless of variability in the combustion turbine operation. The combination of these embodiments is particularly useful with new, high pressure combustion turbine systems which operate at compressor discharge pressures above 190 psia and preferably in the range of 240 to 440 psia.

The present invention is not limited to the use of a double column air separation process, and can be utilized in alternative cycles which operate at conditions of variable product demand and ambient temperature. For example, the present invention could be applied to single column, dephlegmator, cold compression, and other types of air separation processes. The embodiments of the present invention also can be applied to air separation processes which use triple column distillation systems in which a third column is operated at a pressure intermediate the lower and higher pressure columns, for example such as those described in U.S. Pat. Nos. 4,022,030, 5,291,737, and 5,231,837; pending U.S. patent application Ser. No. 08/375,927, and European Patent Application EP 0636845A1.

The essential characteristics of the present invention are described completely in this disclosure. One skilled in the art can understand the invention and make various modifications without departing from the basic spirit of the invention, and without deviating from the scope and equivalents of the claims which follow. For clarity of definition, the claims include reference characters which also appear in the Drawings.

We claim:

1. In an integrated combustion turbine/air separation process which includes compressing air in a combustion turbine air compressor (105), combusting a first portion (7) of the resulting compressed air (6) with a fuel (1) in a combustor (101) to form hot combustion products, expanding the hot combustion products (9) in a hot gas expander (103) which drives the combustion turbine air compressor (105) and optionally an electric generator (107), cooling a second portion (11) of the compressed air, removing impurities from the resulting cooled compressed air (14), and separating the resulting purified compressed air (15) into one or more products, the separation of the purified compressed air (15) is carried out by a method which comprises:

(a) cooling the purified compressed air (15), work expanding a first portion (17) of the resulting cooled air, and introducing the resulting cooled work-expanded air (19) into a lower pressure distillation column (119);

(b) further cooling a second portion (21) of the resulting cooled air, reducing the pressure of the further cooled air (22), and introducing the resulting reduced-pressure cooled air (23) into a higher pressure distillation column (123);

(c) withdrawing an oxygen-enriched liquid bottoms stream (33) from the higher pressure distillation column (123), cooling and reducing the pressure of the stream, and introducing the resulting cooled reduced-pressure stream into the lower pressure distillation column (119); and (d) withdrawing a nitrogen-rich product (35) from the lower pressure distillation column (119).

2. The method of claim 1 which further comprises withdrawing an oxygen-rich product from the lower pressure column.

3. The method of claim 1 which further comprises withdrawing a nitrogen-rich product from the higher pressure column.

4. The method of claim 1 which further comprises:

(e) warming and compressing at least a portion of the nitrogen-rich product (35) from the lower pressure distillation column (119), further warming at least a portion (13) of the resulting warmed compressed nitrogen-enriched stream (12), and introducing further warmed nitrogen (3) into the combustor (101).

5. The method of claim 4 which further comprises:

(f) work expanding a portion (401) of cooled compressed air (12);

(g) cooling and removing impurities from the resulting cooled expanded compressed air (404) of step (f);

(h) further cooling the resulting purified compressed air (26) of step (g); and (i) introducing the resulting further cooled air (27) of step (h) into the higher pressure distillation column (123).

6. The method of claim 5 wherein the cooled compressed air (12) is obtained by cooling the second portion (11) of the compressed air (6) from the combustion turbine compressor (105).

7. The method of claim 5 which further comprises utilizing work generated in the work expansion of step (f) to provide a portion of the work required in step (e) to compress at least a portion of the nitrogen-rich product (36) from the lower pressure distillation column (119) prior to introducing the further warmed nitrogen (3) into the combustor (101).

8. The method of claim 7 which further comprises compressing an additional stream of air (501) and combining the resulting additional compressed air (505) with the resulting cooled compressed air (12).

9. The method of claim 7 which further comprises compressing an additional stream of air (501) and combining the resulting additional compressed air (507) with the resulting cooled expanded compressed air (404) prior to removing impurities therefrom.

10. The method of claim 7 which further comprises compressing an additional stream of air (501) in a first compression stage, withdrawing a portion (603) of the air from the first compression stage and combining the portion (603) with the resulting cooled expanded compressed air (404) prior to removing impurities therefrom, further compressing the remaining air from the first compression stage and combining the resulting further compressed air (605) with the resulting cooled compressed air (14) prior to removing impurities therefrom.

11. The method of claim 4 wherein the nitrogen-rich product (35) contains less than about 4.0 mole % oxygen.

12. The method of claim 4 which further comprises cooling a portion (41) of the warmed compressed nitrogen-enriched stream (12), reducing the pressure of the resulting cooled stream (29), and introducing the resulting cooled reduced-pressure stream (31) into the higher pressure distillation column (123).

13. The method of claim 1 wherein the resulting reduced-pressure cooled air (23) in step (b) is introduced into the higher pressure distillation column (123) at an absolute pressure which is about 20% to about 85% of the absolute pressure of the compressed air (11) from the combustion turbine air compressor.

14. The method of claim 13 wherein the higher pressure distillation column (123) operates at an absolute pressure between 190 and 280 psia.

15. The method of claim 1 wherein the further cooling of the second portion (21) of the of the resulting cooled air in step (b) condenses the air, and wherein the pressure of the resulting condensed air (22) is reduced by isenthalpic throttling or work expansion.

16. The method of claim 1 wherein the second portion (21) of the resulting cooled air in step (b) is partially condensed, the partially condensed air (22) is separated into a vapor (209) and a liquid (205), the liquid (205) is reduced in pressure by isenthalpic throttling and introduced into the higher pressure distillation column (123), and the vapor (209) is work-expanded and introduced into the higher pressure distillation column (123).

17. The method of claim 1 which further comprises compressing additional air (25), removing impurities from the additional compressed air, cooling the resulting purified air (26), and introducing the purified air (27) into the higher pressure distillation column (123).

18. The method of claim 1 which further comprises withdrawing an oxygen-enriched liquid stream (51) from the lower pressure distillation column (119), pumping the liquid stream (51) to an elevated pressure, warming the resulting pressurized liquid (53) by indirect heat exchange with the purified compressed air (15) of step (a) and optionally other process streams, thereby cooling the purified compressed air and vaporizing the liquid (53) to provide an elevated pressure oxygen-enriched gas product (54).

19. The method of claim 18 which further comprises storing a portion (301) of the resulting pressurized liquid (53) from the higher pressure column (123) during periods of low demand for the elevated pressure oxygen-enriched gas product (54) and combining at least a portion of the resulting stored liquid (305) with the oxygen-enriched liquid stream (51) during periods of high demand for the elevated pressure oxygen-enriched gas product (54).

20. The method of claim 18 wherein the elevated pressure oxygen-enriched gas product (54) is utilized in the gasification of a carbonaceous material to produce the fuel (1) for the gas turbine combustor (101).

21. The method of claim 1 which further comprises storing a portion (309) of the oxygen-enriched liquid bottoms (33) from the higher pressure distillation column (123) during periods of low demand for the elevated pressure oxygen-enriched gas product (54) and return nitrogen (13), and combining at least a portion (313) of the resulting stored liquid with the oxygen-enriched liquid bottoms (33) during periods of high demand for the elevated pressure oxygen-enriched gas product (54) and return nitrogen (13).

22. The method of claim 1 which further comprises withdrawing a nitrogen-enriched vapor stream (43) from the top of the higher pressure distillation column (123), condensing the stream, pumping a portion (45) of the resulting condensed liquid to an elevated pressure, warming the resulting pressurized liquid (47) by indirect heat exchange with the purified compressed air (15) of step (a) and optionally other process streams, thereby cooling the purified compressed air (15) and providing an elevated pressure nitrogen-enriched gas product (49).

23. The method of claim 22 which further comprises withdrawing a nitrogen-enriched stream (37) from an intermediate point of the higher pressure distillation column (123), cooling the stream to yield a nitrogen-enriched liquid (38), reducing the pressure of the nitrogen-enriched liquid, and introducing the resulting reduced-pressure nitrogen-enriched liquid (40) into the lower pressure distillation column (119) as reflux.

24. The method of claim 23 which further comprises storing a portion of the nitrogen-enriched liquid (38) from the higher pressure distillation column (123) during periods of low demand for the return nitrogen (13) and, during periods of high demand for the return nitrogen (13), combining the resulting stored nitrogen-enriched liquid (321) with at least a portion of the reduced-pressure nitrogen-enriched liquid (40) prior to introduction into the lower pressure distillation column (119) as reflux.

* * * * *